United States Patent
Tanaka (10) Patent No.: US 11,391,565 B2
(45) Date of Patent: Jul. 19, 2022

(54) MARKER AND MARKER MANUFACTURING METHOD

(71) Applicant: National Institute of Advanced Indostiral Science and Technology, Tokyo (JP)

(72) Inventor: Hideyuki Tanaka, Nagareyama (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 411 days.

(21) Appl. No.: 16/468,208

(22) PCT Filed: Oct. 26, 2017

(86) PCT No.: PCT/JP2017/038712
§ 371 (c)(1),
(2) Date: Jun. 10, 2019

(87) PCT Pub. No.: WO2018/110114
PCT Pub. Date: Jun. 21, 2018

(65) Prior Publication Data
US 2020/0011660 A1 Jan. 9, 2020

(30) Foreign Application Priority Data
Dec. 12, 2016 (JP) .............................. JP2016-240354

(51) Int. Cl.
*G01B 11/26* (2006.01)
*G01C 15/00* (2006.01)
(Continued)

(52) U.S. Cl.
CPC ............ *G01B 11/26* (2013.01); *G01C 15/002* (2013.01); *G01C 15/06* (2013.01); *G02B 3/0012* (2013.01)

(58) Field of Classification Search
None
See application file for complete search history.

(56) References Cited

U.S. PATENT DOCUMENTS

| 4,730,920 A | 3/1988 | Schlemmer et al. |
| 5,539,487 A | 7/1996 | Taguchi et al. |

(Continued)

FOREIGN PATENT DOCUMENTS

| CN | 1477409 A | 2/2004 |
| CN | 103026458 A | 4/2013 |

(Continued)

OTHER PUBLICATIONS

International Search Report dated Dec. 5, 2017, issued in PCT Application No. PC/JP2013/078712, filed Oct. 26, 2017.

(Continued)

*Primary Examiner* — Christopher W Fulton
(74) *Attorney, Agent, or Firm* — Workman Nydegger (57) ABSTRACT

Provided are a marker that enables, within a smaller area size, measurement of the position or the attitude of an object, and a marker manufacturing method. The marker is provided with a variable moire pattern 3 that includes a striped pattern 9 which is formed on a two-dimensional plane and a lens array 7 in which a plurality of lenses are arranged on the two-dimensional plane on which the striped pattern 9 is formed.

4 Claims, 10 Drawing Sheets

(51) Int. Cl.
    *G01C 15/06*     (2006.01)
    *G02B 3/00*     (2006.01)

(56) References Cited

U.S. PATENT DOCUMENTS

| | | | |
|---|---|---|---|
| 8,881,413 B2 * | 11/2014 | Nagao | G01C 15/06 |
| | | | 33/293 |
| 10,591,647 B2 * | 3/2020 | Saito | G02B 3/06 |
| 10,928,191 B2 * | 2/2021 | Tanaka | G01B 11/254 |
| 2010/0245806 A1 | 9/2010 | Lundvall | |
| 2012/0047340 A1 | 2/2012 | Inaba | |
| 2014/0111639 A1 | 4/2014 | Tanaka et al. | |
| 2019/0072693 A1 * | 3/2019 | Saito | G02B 3/0056 |
| 2019/0293841 A1 * | 9/2019 | Saito | G01B 11/00 |
| 2019/0369301 A1 * | 12/2019 | Sasaki | G02B 3/00 |

FOREIGN PATENT DOCUMENTS

| | | |
|---|---|---|
| CN | 103262520 A | 8/2013 |
| CN | 103858208 A | 6/2014 |
| CN | 103930796 A | 7/2014 |
| JP | H02-248805 A | 10/1990 |
| JP | 2006-267879 A | 10/2006 |
| JP | 2012-145559 A | 8/2012 |
| JP | 2014-501908 A | 1/2014 |
| JP | 2014-102246 A | 6/2014 |
| WO | 2012-047340 A1 | 4/2012 |
| WO | 2016-024555 A1 | 2/2019 |

OTHER PUBLICATIONS

International Preliminary Reporton Patentability dated Jun. 18, 2019, issued in PCT Application No. PC/JP2013/078712, filed Oct. 26, 2017.

Chinese Office Action dated Jun. 10, 2020, issued in Chinese Application No. 201780074921.4.

European Search Report dated Jun. 24, 2020, issued in EP Application No. 17880436.5.

* cited by examiner

```
FORM A PLURALITY OF DIFFERENT PATTERNS ON A
TOP SURFACE OF ONE LENS SUBSTRATE               — S1
OR A BACK SURFACE OF A LENS ARRAY
```

```
PLACE A LENS ARRAY ON THE TOP SURFACE OF THE LENS
SUBSTRATE INCLUDING THE PATTERN
OR PLACE THE LENS ARRAY HAVING
THE PATTERN ON THE BACK SURFACE ON THE TOP SURFACE    — S2
OF THE LENS SUBSTRATE,
OR COLOR THE ENTIRETY OF THE BACK SURFACE INCLUDING
THE PATTERN WITH A COLOR DIFFERENT
FROM THAT OF THE PATTERN
```

PRIOR ART

PRIOR ART

PRIOR ART

MARKER AND MARKER MANUFACTURING METHOD

TECHNICAL FIELD

The present invention relates to a marker to measure the position or posture of an object and the manufacturing method thereof.

BACKGROUND ART

A mark is used to measure the relative positions or postures between an object in a three-dimensional space and a camera (visual point) by processing an image obtained by imaging the object by a camera. Such a mark is generally called a marker. Markers include a marker consisting of a planar pattern that is called a planar visual marker.

Figure 21:
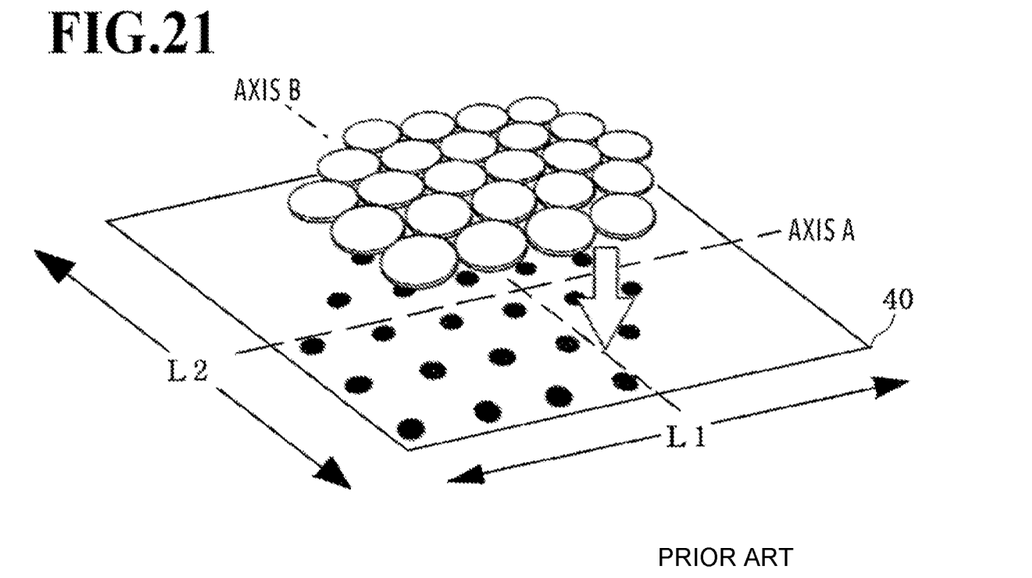
FIG. 21 is a perspective view illustrating the configuration of a conventional variable moire pattern in which dots have thereon a lens array.

FIG. 21 illustrates one of such planar visual markers. A lens array is placed on a pattern consisting of a plurality of dots on a two-dimensional plane 40 as shown in the arrows in the drawing. A planar visual marker includes a variable moire pattern having a gray level pattern changing depending on a direction along which the pattern is visually recognized. The visual line angle about two axes of an axis A and an axis B is measured by observing the variable moire pattern. (see Patent Publications 1 and 2). The definition of a visual line angle will be described later.

PATENT LITERATURE

Patent Publication 1—Japanese Patent Laid-Open No. 2012-145559
Patent Publication 2—Japanese Patent Laid-Open No. 2014-102246

SUMMARY OF INVENTION

Technical Problem

In the case of the variable moire pattern having a structure in which a dot pattern has thereon a lens array as described above, to measure the visual line angle about the two axes, longitudinal and lateral lengths L1 and L2 constituting the two-dimensional plane 40 need to be equal due to the symmetry thereof. This causes a disadvantage that the two-dimensional plane 40 undesirably requires a relatively-large area, causing poor usability. The planar visual marker is generally provided and used in a human living environment. Thus, the planar visual marker is desired to have a minimized size from an aesthetic viewpoint.

In order to eliminate the disadvantage as described above, it is an objective of the present invention to provide a marker configured to measure the position or posture of an object with a smaller area, and the manufacturing method thereof.

Solution to Problem

In order to eliminate the disadvantage as described above, the present invention provides a marker that includes a stripe pattern formed on a two-dimensional plane shape and a lens array in which a plurality of lenses are arranged on the two-dimensional plane having the stripe pattern.

In order to eliminate the disadvantage as described above, the present invention provides a method of manufacturing a marker in which an observed pattern changes depending on a direction. The method includes a first step of forming a plurality of different patterns on a top surface of one lens substrate or a back surface of a lens array and a second step of placing a lens array consisting of a plurality of lenses on the top surface of the lens substrate having thereon the pattern, or placing the lens array having the pattern on the back surface on the top surface of the lens substrate, or color the entirety of the back surface having the pattern with a color different from that of the pattern.

Advantageous Effects of Invention

The present invention provides a marker by which the position or posture of an object is measured with a smaller area and the manufacturing method thereof.

DESCRIPTION OF EMBODIMENTS

The following section will describe an embodiment of the present invention with reference to the drawings in which the same reference numerals denote the same or similar parts.

First, with reference to FIG. 1, the definitions of terms will be described. The following section will exemplarily describe the phenomena at the periphery of the X axis. However, the following definitions also apply to other phenomena at the periphery of an arbitrary axis.

Figure 1:
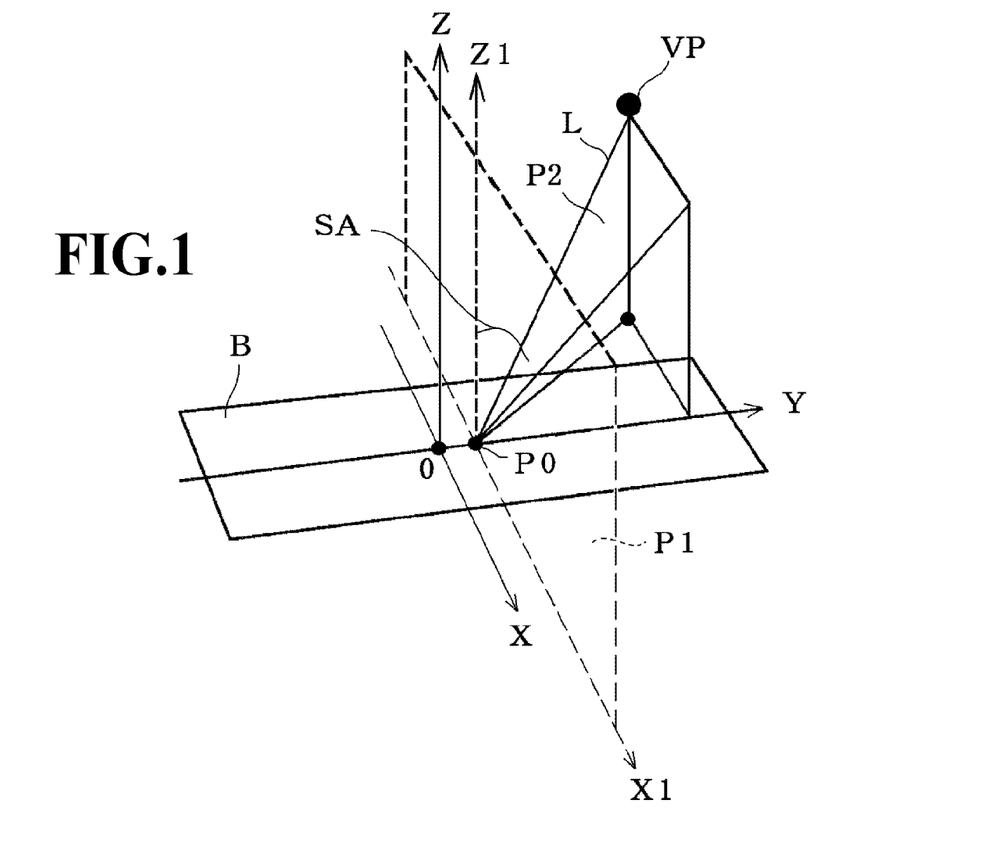
FIG. 1 illustrates the definitions of a visual line and a visual line angle.

In FIG. 1, it is assumed that a center of moving marks M1 and M2 (which will be described later) is a look-at point P0, an axis formed by a measurement object on a plane B that is parallel to the X axis and that passes through the look-at point P0 is an X1 axis, and an axis that is parallel to the Z axis vertical to the plane B and that passes through the look-at point P0 is a Z1 axis.

A line L shown in FIG. 1 that connects an observation visual point VP and the look-at point P0 is called a visual line. As shown in FIG. 1, it is assumed that a plane including the Z1 axis and the X1 axis orthogonal to the Z1 axis is a plane P1 and a plane including the line L and the X1 axis is a plane P2. In this case, an angle SA formed by the plane P1 and the plane P2 is called a visual line angle around the X axis.

Embodiment 1

Figure 2:
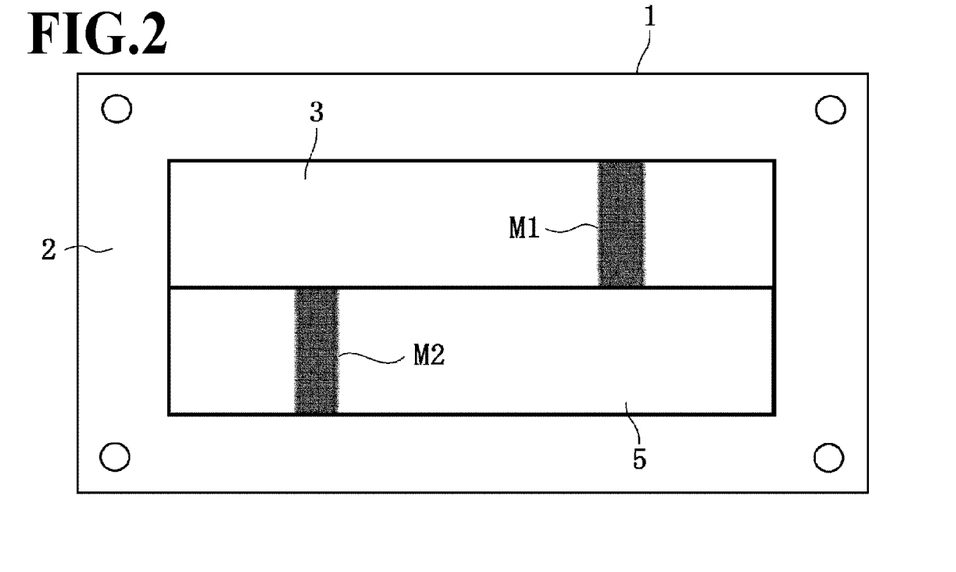
FIG. 2 is a plan view illustrating the configuration of a planar visual marker 1 according to Embodiment 1 of the present invention.

FIG. 2 is a plan view illustrating the configuration of the planar visual marker 1 according to Embodiment 1 of the present invention. As shown in FIG. 2, the planar visual marker 1 includes a two-dimensional pattern 2 and the variable moire patterns 3 and 5. The variable moire patterns 3 and 5 both have oblong planar shapes whose long sides are joined to each other. In the variable moire patterns 3 and 5, the moving marks M1 and M2 are observed that are visually recognized as continuously and smoothly moving depending on the visual line angle in the left-and-right direction in the drawing.

Figure 3:
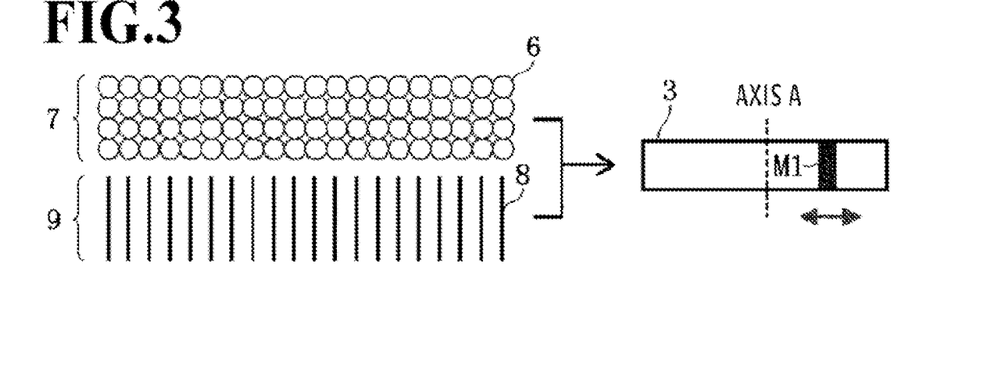
FIG. 3 is a plan view illustrating a method of manufacturing a variable moire pattern 3 shown in FIG. 2.
Figure 4:
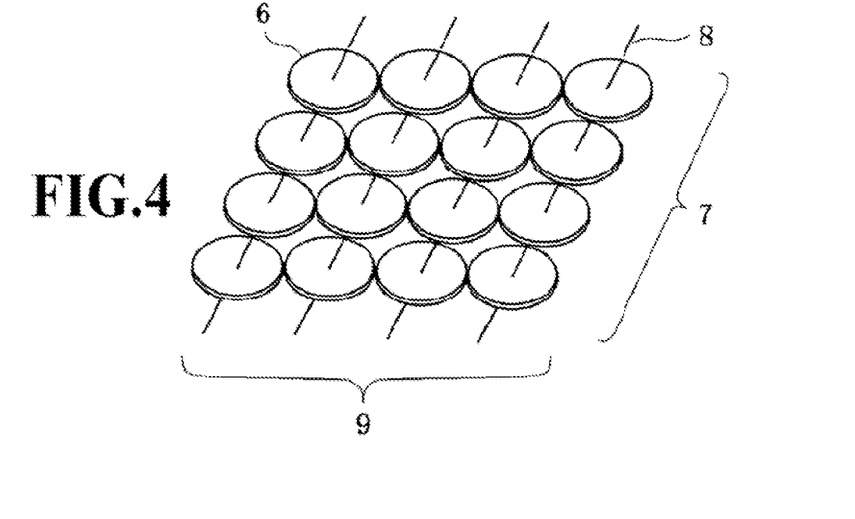
FIG. 4 is a perspective view illustrating the structure of the variable moire pattern 3 shown in FIG. 3.

FIG. 3 is a plan view illustrating the manufacturing method of the variable moire pattern 3 shown in FIG. 2. The variable moire pattern 3 forms a stripe pattern 9 shown in FIG. 3 on a two-dimensional plane forming the top surface of the lens substrate. The variable moire pattern 3 is manufactured by placing a lens array 7 in which lenses 6 are arranged on the stripe pattern 9. FIG. 4 illustrates the structure of the variable moire pattern 3.

The stripe pattern 9 consists of a plurality of straight lines 8 that are parallel to the direction along which the lenses 6 are arranged in the longitudinal direction in the drawing and that are arranged with an interval that is slightly different from the interval with which the lenses 6 are arranged. FIG. 3 shows an example in which the lens array 7 includes the lenses 6 arranged in a lattice-like manner. However, the lenses 6 also may be arranged in a honeycomb-like manner. The configuration of the variable moire pattern 3 shown in FIG. 3 is merely an example. The number of the lenses 6 and the number of the straight lines 8 are not limited to those shown in FIG. 3.

In the case of the variable moire pattern 3 having the configuration as described above, a moving mark M1 is visually recognized as moving in the direction shown by the arrow (the left-and-right direction in the drawing) depending on a change of the visual line angle around the axis A. The moving mark M1 is visually recognized as having an appearance in which a part of the stripe pattern 9 is enlarged.

Thus, the variable moire pattern 3 is used to uniquely calculate the visual line angle around the axis A depending on the position of the observed moving mark M1. Thus, the planar visual marker 1 having a smaller size and requiring a smaller area is achieved.

Figure 5:
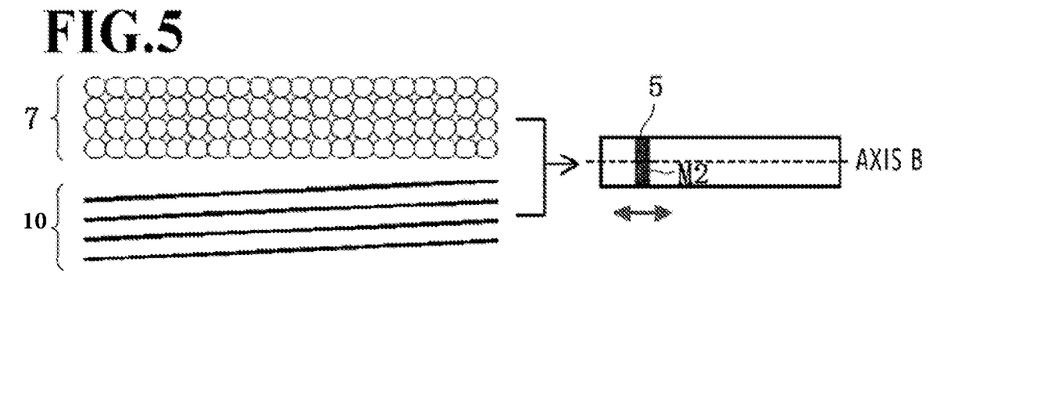
FIG. 5 is a plan view illustrating the method of manufacturing a variable moire pattern 5 shown in FIG. 2.

FIG. 5 is a plan view illustrating the manufacturing method of the variable moire pattern 5 shown in FIG. 2. The variable moire pattern 5 forms a stripe pattern 10 shown in FIG. 5 on a two-dimensional plane forming the top surface of the lens substrate. The variable moire pattern 5 is manufactured by placing a lens array 7 on the stripe pattern 10.

When assuming that a is an inclination angle, the stripe pattern 10 has a direction different from the stripe pattern 9 shown in FIG. 3 by [90±α] degrees. The stripe pattern 10 is formed to be slightly inclined relative to the lenses 6 arranged in the left-and-right direction of FIG. 5. The straight lines constituting the stripe pattern 10 are arranged with an interval substantially the same as the interval with which the lenses 6 are arranged. The lens array 7 also may be configured by the lenses 6 arranged in a honeycomb-like manner. The configuration of the variable moire pattern 5 shown in FIG. 5 is merely an example. The number of the lenses 6 and the number of the straight lines constituting the stripe pattern 10 are not limited to those shown in FIG. 5.

In the case of the variable moire pattern 5 having the configuration as described above, the moving mark M2 is visually recognized as moving in the direction shown by the arrow (the left-and-right direction in the drawing) depending on a change of the visual line angle around the axis B orthogonal to the axis A shown in FIG. 3. The moving mark M2 is visually recognized as having an appearance in which a part of the stripe pattern 10 is enlarged.

Thus, the variable moire pattern 5 is used to calculate the visual line angle around the axis B depending on the observed moving mark M2. Thus, the planar visual marker 1 having a smaller size and requiring a smaller area is achieved.

Figure 6:
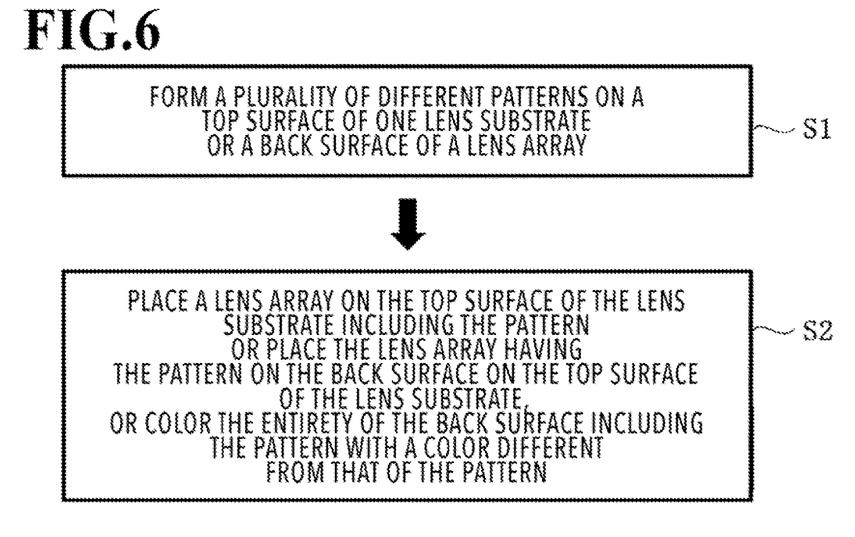
FIG. 6 is a flowchart illustrating the manufacturing method of the variable moire patterns 3 and 5 shown in FIG. 2.

The planar visual marker 1 shown in FIG. 2 is obtained by arranging the two variable moire patterns 3 and 5 manufactured by the method as described above so that the long sides of the oblong shape forming the external form are adjacent to each other. On the other hand, the variable moire patterns 3 and 5 also may be manufactured in an integrated manner by the procedure shown in FIG. 6.

Figure 7:
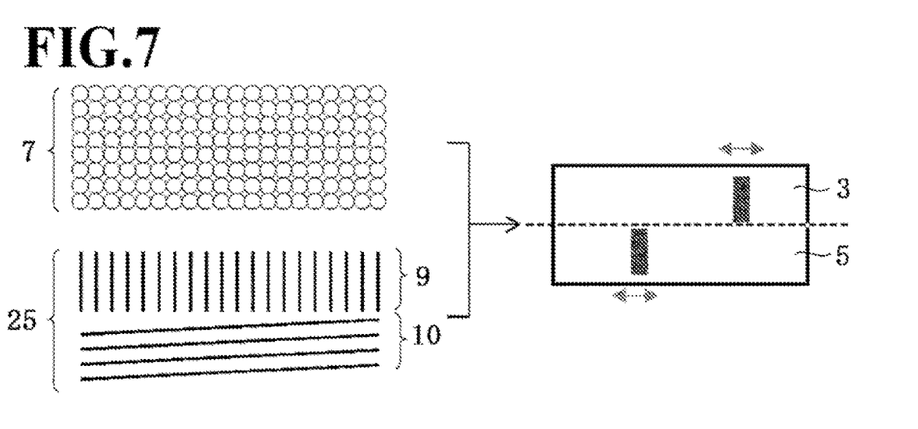
FIG. 7 is a plan view illustrating the manufacturing method of the variable moire patterns 3 and 5 shown in FIG. 6.

In Step S1, a plurality of different patterns, e.g., a stripe pattern 25 shown in FIG. 7 including the stripe patterns 9 and 10 are formed on a top surface of one lens substrate or a back surface of a lens array. In Step S2, the lens array 7 shown in FIG. 7 is placed on the top surface of the lens substrate having thereon the plurality of different patterns. Alternatively, the lens array having the pattern on the back surface is placed on the top surface of the lens substrate or the entirety of the back surface having thereon the pattern is colored with a color different from that of the pattern.

The pattern formation in Step S1 is realized by a method of directly printing pattern on the top surface of the lens substrate or the back surface of the lens array, or a method of forming a groove in the top surface of the lens substrate or the back surface of the lens array to color the groove for example. The latter method of forming the groove provides the integral molding of the top surface of the lens array and the groove of the back surface of the lens array to thereby provide an easier manufacture process to reduce the cost. The integral molding provides an improved accuracy of the positional relation between the lens array and the pattern.

In Step S2, the entirety of the back surface of the lens array is colored by directly coloring the back surface or adhering a colored sheet on the back surface for example. The color also may be transparent. In this case, the pattern is observed even at night by illuminating the back surface of the lens array with backlighting. When the entirety of the back surface of the lens array has a color different from that of the pattern, the pattern is observed in the lens array itself. Thus, this does not always have to be combined with the lens substrate or a part corresponding to the lens substrate.

According to the manufacturing method as described above, different patterns are simultaneously formed on the top surface of the lens substrate or the back surface of the lens array and no need is required to prepare lens arrays for the respective different patterns. As a result, a common lens array 7 is placed, thus reducing the manufacture cost.

Figure 8A:
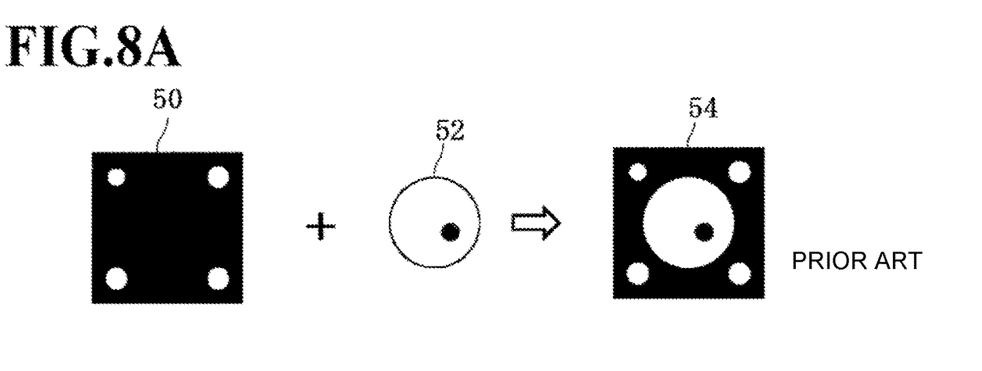
FIG. 8A is a plan view illustrating the configuration of a conventional planar visual marker in order to explain the effect of the planar visual marker 1 shown in FIG. 2.
Figure 8B:
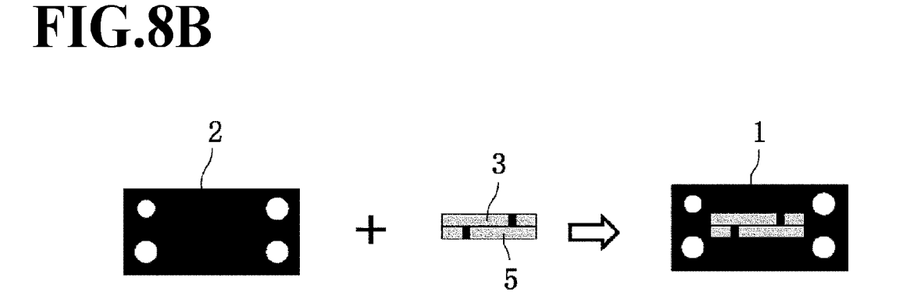
FIG. 8B is a plan view illustrating the configuration of the planar visual marker 1 in order to explain the effect of the planar visual marker 1 shown in FIG. 2.

FIGS. 8A to 8B are a plan view illustrating the effect of the planar visual marker 1 shown in FIG. 2. FIG. 8A illustrates a conventional planar visual marker. FIG. 8B illustrates the configuration of the planar visual marker 1 shown in FIG. 2. As shown in FIG. 8A, a conventional planar visual marker 54 has a configuration obtained by combining a two-dimensional pattern 50 with the variable moire pattern 52 having the same configuration as that of a conventional variable moire pattern shown in FIG. 21. The variable moire pattern 52 is configured so that the dots shown in FIG. 21 are visually recognized as moving within the variable moire pattern 52 in a two-dimensional manner.

On the other hand, the planar visual marker 1 shown in FIG. 2 has a configuration obtained by combining the two-dimensional pattern 2 and the variable moire patterns 3 and 5 as shown in FIG. 8B. In the variable moire patterns 3 and 5, the moving marks M1 and M2 shown in FIG. 2 are visually recognized as moving in a one-dimensional manner in response to a change of the posture around the two axes orthogonal to each other, respectively.

As shown in FIG. 8A and FIG. 8B, the variable moire patterns 3 and 5 realize, with a smaller area, the same function as that achieved by the conventional variable moire pattern 52. Thus, the planar visual marker 1 have a thinner and smaller size than that of the planar visual marker 54.

Figure 9:
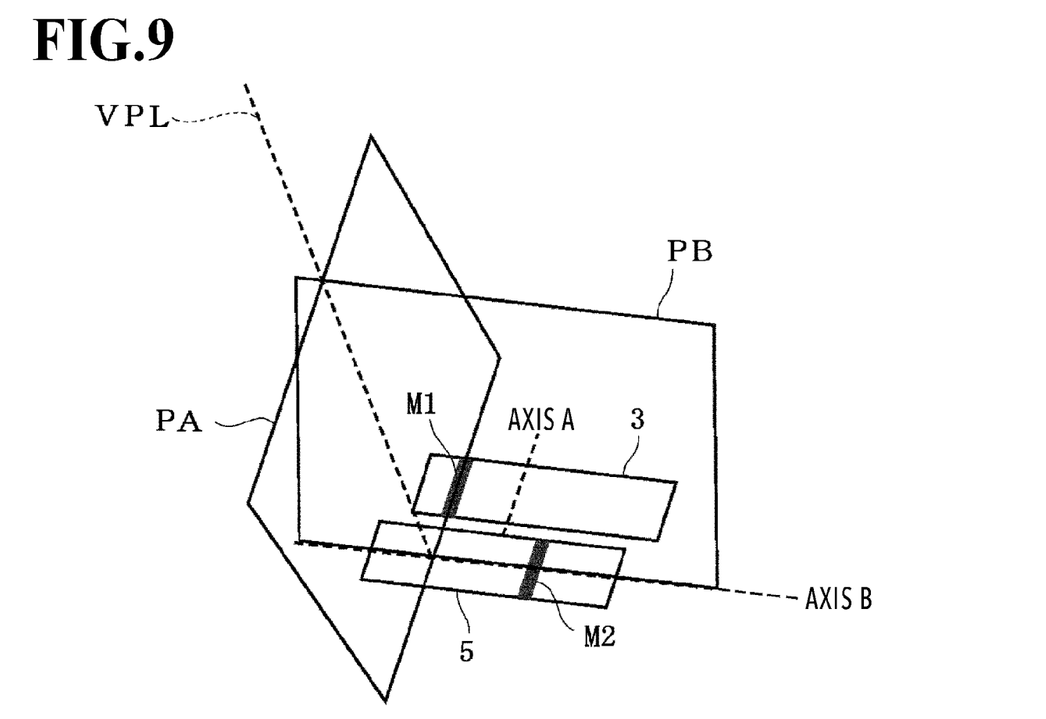
FIG. 9 is a perspective view illustrating the posture measurement method using the planar visual marker 1 shown in FIG. 2.

The following section will describe the posture measurement method using the planar visual marker 1 shown in FIG. 2 with reference to FIG. 9.

In the variable moire pattern 3, the visual line angle around the axis A is uniquely identified depending on the position of the observed moving mark M1 to calculate the plane (visual point plane) PA including the visual point. In the variable moire pattern 5, the visual line angle around the axis B is uniquely identified depending on the position of the observed moving mark M2 to calculate the visual point plane PB. The resultant two visual point planes PA and PB is used to calculate a straight line (visual point straight line) VPL along which a visual point exists as an intersection of these two planes. This visual point straight line VPL shows the direction of the visual line relative to the planar visual marker 1.

The planar visual marker 1 shown in FIG. 2 is provided so that the long sides of the two variable moire patterns 3 and 5 are abutted to each other. Other combinations or arrangements also may be used so long as the two visual point planes calculated as described above are allowed to intersect at a certain intersection line. The two variable moire patterns 3 and 5 do not have to have the same size. Three or more variable moire patterns also may be combined.

Figure 10:
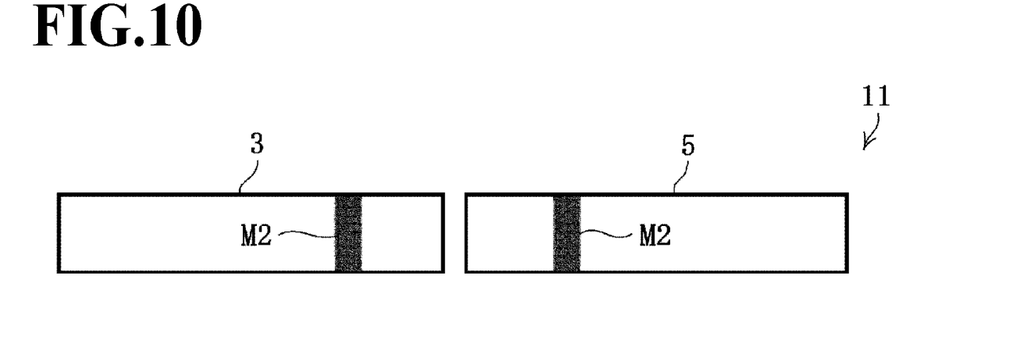
FIG. 10 is a plan view illustrating the first modification example of the planar visual marker 1 shown in FIG. 2.

FIG. 10 is a plan view illustrating the first modification example of the planar visual marker 1 shown in FIG. 2. From FIG. 10 to FIG. 14 as well as FIG. 16 and FIG. 17, two-dimensional patterns included in the planar visual markers 11, 13, 15, 17, and 19 are omitted.

As shown in FIG. 10, in the planar visual marker 11 as the first modification example, the corresponding long sides of the variable moire patterns 3 and 5 are arranged side by side so as to be positioned on the same line. In FIG. 10, the variable moire patterns 3 and 5 adjacent to each other are closely provided. However, a wider interval may be provided in the lateral direction.

Figure 11:
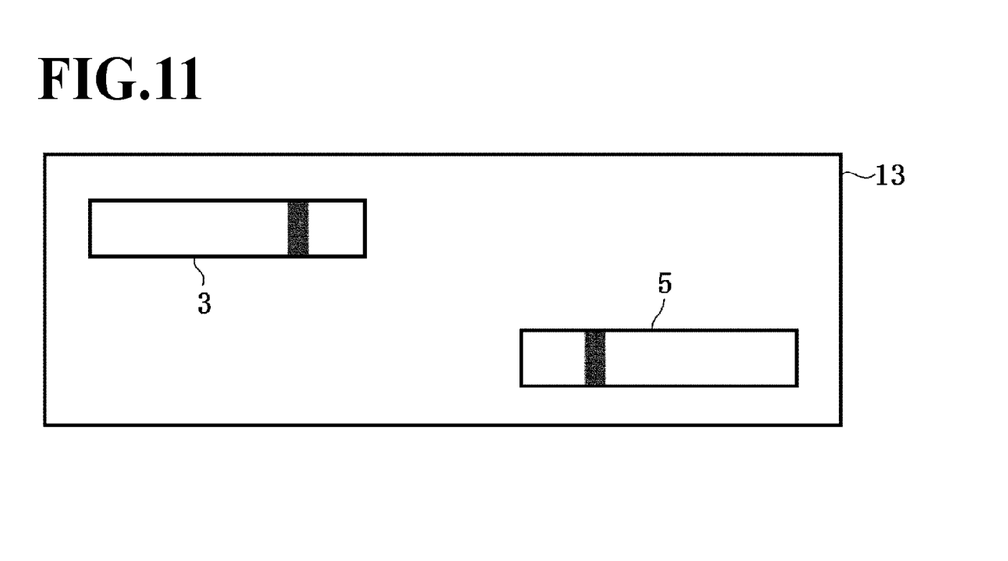
FIG. 11 is a plan view illustrating the second modification example of the planar visual marker 1 shown in FIG. 2.

FIG. 11 is a plan view illustrating the second modification example of the planar visual marker 1 shown in FIG. 2. In the planar visual marker 11 shown in FIG. 10, the two variable moire patterns 3 and 5 are provided so that the corresponding long sides are positioned on the same line. On the other hand, in the planar visual marker 13 as the second modification example as shown in FIG. 11, the two variable moire patterns 3 and 5 are provided so that the corresponding long sides are positioned on lines parallel to each other. In FIG. 11, the two variable moire patterns 3 and 5 are provided on the parallel lines at positions slightly dislocated in the lateral direction in the drawing. However, the dislocation amount may be arbitrary. Thus, no dislocation also may be possible.

According to the planar visual markers 1, 11, and 13 of Embodiment 1 of the present invention, the visual line angles around the axis A and the axis B is calculated depending on the positions of the moving marks M1 and M2. This consequently provides the measurement of the posture of the visual point relative to the planar visual markers 1, 11, and 13. Embodiment 1 of the present invention provides, when compared with a conventional marker configured so that a dot pattern has thereon a lens array, a marker having a smaller size and requiring a smaller area.

Embodiment 2

Figure 12:
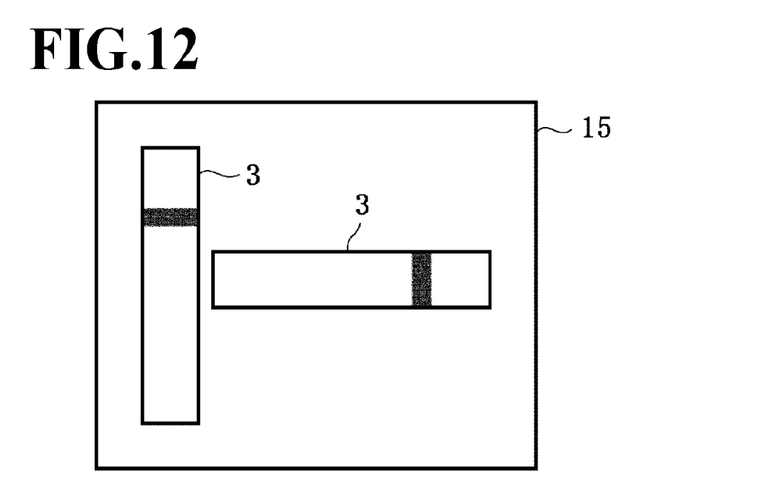
FIG. 12 is a plan view illustrating the configuration of the planar visual marker 15 according to Embodiment 2 of the present invention.

FIG. 12 is a plan view illustrating the configuration of the planar visual marker 15 according to Embodiment 2 of the present invention. As shown in FIG. 12, the planar visual marker 15 according to Embodiment 2 of the present invention is obtained by combining two similar variable moire patterns 3.

Alternatively, three or more variable moire patterns 3 also may be combined. Alternatively, the variable moire pattern 3 may be substituted with the variable moire pattern 5.

As shown in FIG. 12, in the planar visual marker 15, the two variable moire patterns 3 forming an oblong shape are provided so that the long sides of the oblong shape are orthogonal to each other and the intersection point is positioned at the center of one of the variable moire patterns 3 to form a so-called T-like shape.

By providing the similar variable moire patterns 3 so as to be orthogonal to each other, the visual line angle around two axes orthogonal to each other is obtained as in the planar visual markers 1, 11, and 13 according to Embodiment 1.

Figure 13:
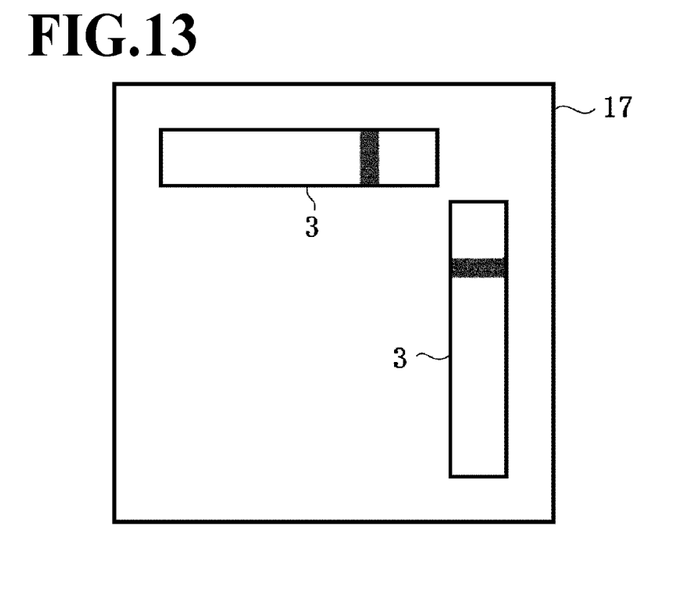
FIG. 13 is a plan view illustrating the first modification example of the planar visual marker 15 shown in FIG. 12.
Figure 14:
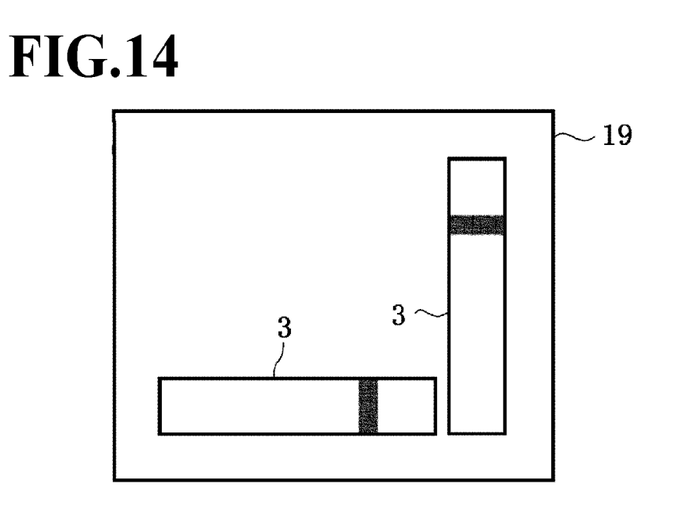
FIG. 14 is a plan view illustrating the second modification example of the planar visual marker 15 shown in FIG. 12.

FIG. 13 and FIG. 14 illustrate the planar visual markers 17 and 19 as a modification example of the planar visual marker 15 shown in FIG. 12. In these planar visual markers 17 and 19, the two variable moire patterns 3 are provided so that the long sides are orthogonal to each other and are provided along the adjacent two sides of the planar visual markers 17 and 19 forming an oblong shape.

The two variable moire patterns 3 may have an arbitrary interval in the lateral direction in the drawing. When the two variable moire patterns 3 are close to each other in the lateral direction, the planar visual marker 17 shown in FIG. 13 is obtained. When the two variable moire patterns 3 are provided to have an interval therebetween in the lateral direction, the planar visual marker 19 shown in FIG. 14 is obtained.

The planar visual markers 15, 17, and 19 according to Embodiment 2 of the present invention use similar variable moire pattern 3 or variable moire pattern 5 to provide the planar visual markers 15, 17, and 19 having the same functions as those of the planar visual markers 1, 11, and 13 according to Embodiment 1. Embodiment 2 of the present invention reduces the manufacture cost.

Figure 15A:
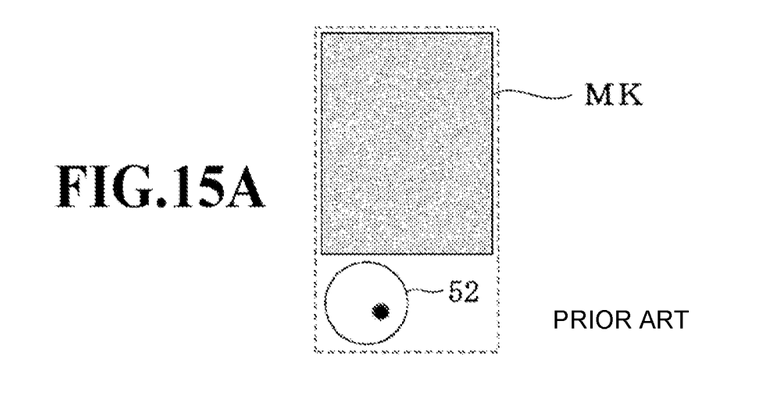
FIG. 15A is a plan view illustrating an example of a conventional planar visual marker in order to explain the effect of the planar visual marker according to Embodiments 1 and 2 of the present invention.
Figure 15B:
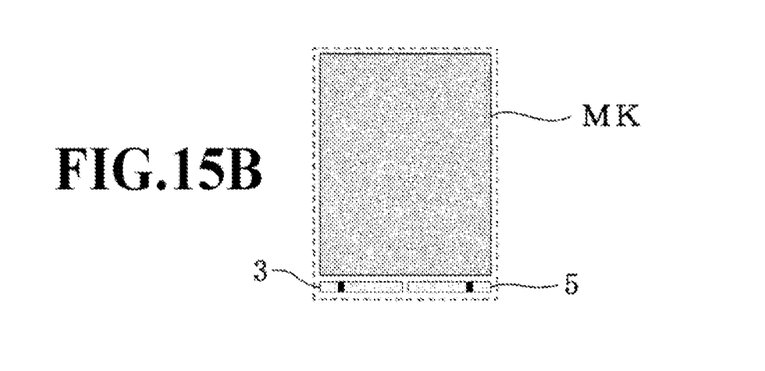
FIG. 15B is a plan view illustrating the first example of the planar visual marker according to Embodiment 1 of the present invention in order to explain the effect of the planar visual marker according to Embodiments 1 and 2 of the present invention.
Figure 15C:
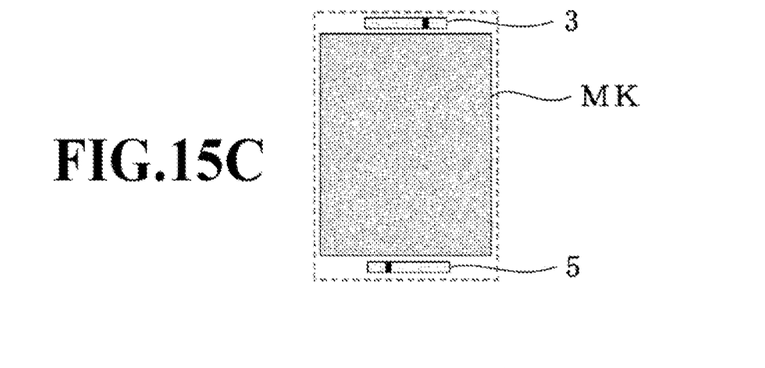
FIG. 15C is a plan view illustrating the second example of the planar visual marker according to Embodiment 1 of the present invention in order to explain the effect of the planar visual marker according to Embodiments 1 and 2 of the present invention.
Figure 15D:
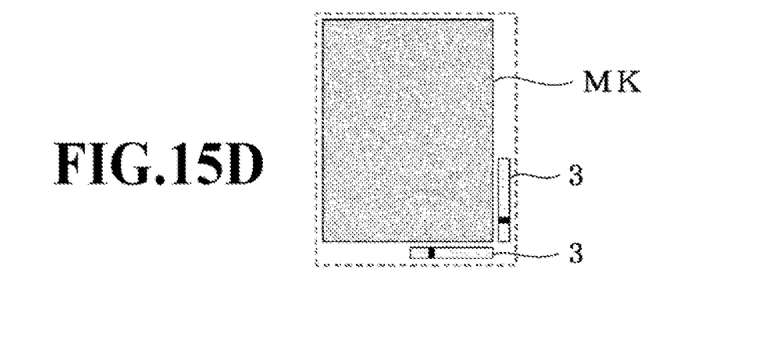
FIG. 15D is a plan view illustrating an example of the planar visual marker according to Embodiment 2 of the present invention in order to explain the effect of the planar visual marker according to Embodiments 1 and 2 of the present invention.

FIGS. 15A to 15D are a plan view illustrating the effect of the planar visual marker according to Embodiments 1 and 2 of the present invention. FIG. 15A illustrates an example of a conventional planar visual marker. FIG. 15B and FIG. 15C illustrate an example of the planar visual marker according to Embodiment 1 of the present invention. FIG. 15D illustrates an example of the planar visual marker according to Embodiment 2 of the present invention. In the drawings, the broken lines show the entirety of the planar visual marker.

As shown in FIG. 15A, when the conventional variable moire pattern shown in FIG. 21 is used, the symmetry structure requires the variable moire pattern 52 having the same size in the longitudinal and lateral directions to be combined with a two-dimensional pattern MK. Thus, the entirety of the resultant planar visual marker based on the combination requires a larger area. In addition, the variable moire pattern 52 must be positioned at any of the upper, lower, left, or right side of the two-dimensional pattern MK in the drawing.

When the variable moire patterns 3 and 5 described in Embodiments 1 and 2 are used, as shown in FIG. 15B to FIG. 15D, similar or different variable moire patterns 3 and 5 is provided along one or a plurality of side(s) forming the external form of the two-dimensional pattern MK. Thus, the entirety of the planar visual marker requires a smaller area. At the same time, the variations of the arrangements of the variable moire patterns 3 and 5 is increased to thereby increase the diversity and flexibility of the design of the entire planar visual marker.

Embodiment 3

Figure 16:
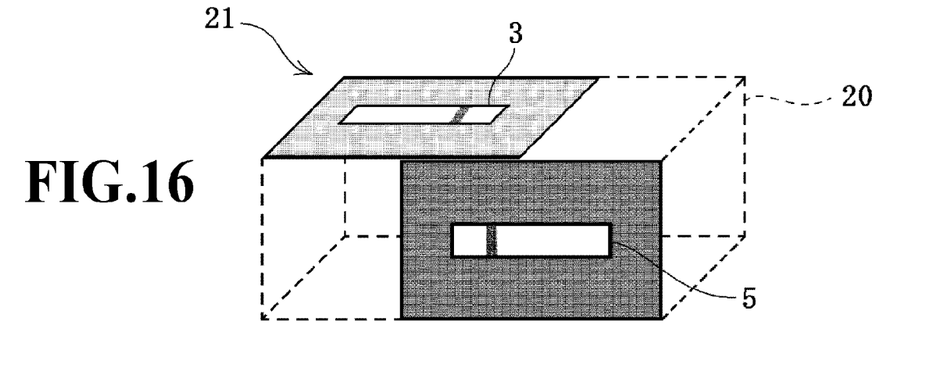
FIG. 16 illustrates the configuration of a stereoscopic marker 21 according to Embodiment 3 of the present invention.
Figure 17:
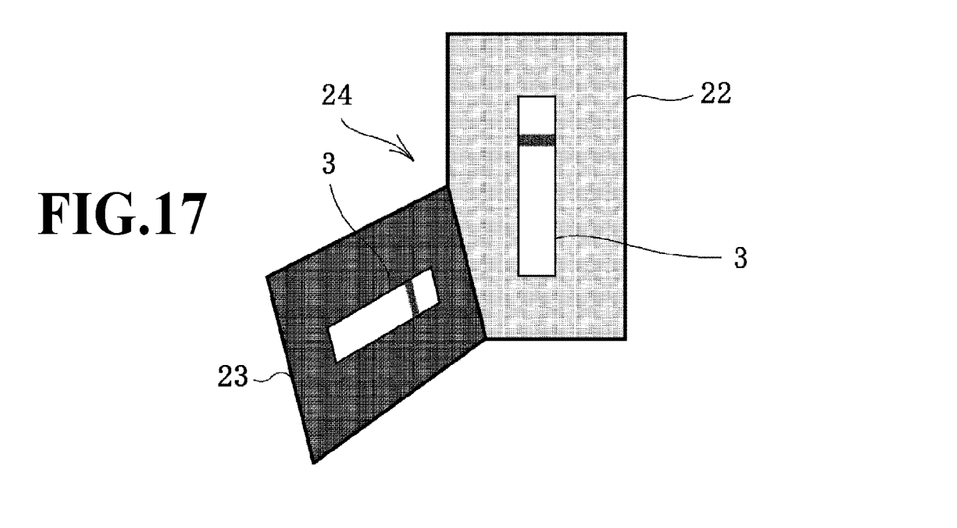
FIG. 17 illustrates a modification example of the stereoscopic marker 21 shown in FIG. 16.

In Embodiments 1 and 2, the planar visual markers 1, 11, 13, 15, 17, and 19 is described in which the variable moire patterns 3 and 5 is provided on the same two-dimensional plane. However, the variable moire patterns 3 and 5 also may be provided on an arbitrary number of planes. A specific example will be described in the following description, FIG. 16 illustrates the configuration of the stereoscopic marker 21 according to Embodiment 3 of the present invention. As shown in FIG. 16, in the stereoscopic marker 21, a top face of an oblong parallelopiped 20 has thereon the variable moire pattern 3 and the side face has thereon the variable moire pattern 5, respectively. FIG. 17 shows a stereoscopic marker 24 as a modification example of the stereoscopic marker 21. However, the stereoscopic marker 24 is configured so that similar variable moire pattern 3 are provided on different planes 22 and 23.

The stereoscopic markers 21 and 24 according to Embodiment 3 also is used to calculate, as in the planar visual markers 1, 11, 13, 15, 17, and 19 according to Embodiments 1 and 2, the visual line angle depending on the positions of the moving marks M1 and M2 observed in the variable moire patterns 3 and 5 to thereby measure the posture of the three-dimensional object.

Figure 18A:
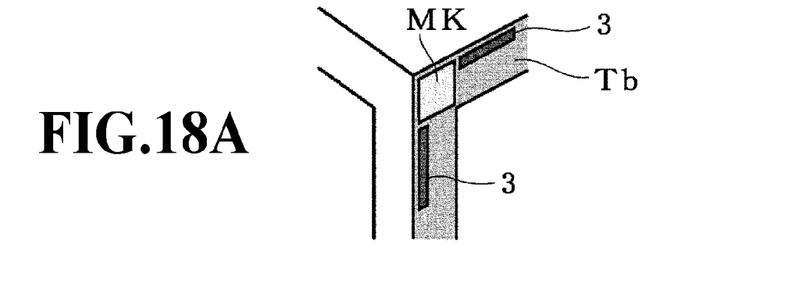
FIG. 18A is a perspective view illustrating, in order to explain the effect of the marker according to Embodiments 1 to 3 of the present invention, a case where the two variable moire patterns 3 and 5 are arranged on the same plane.
Figure 18B:
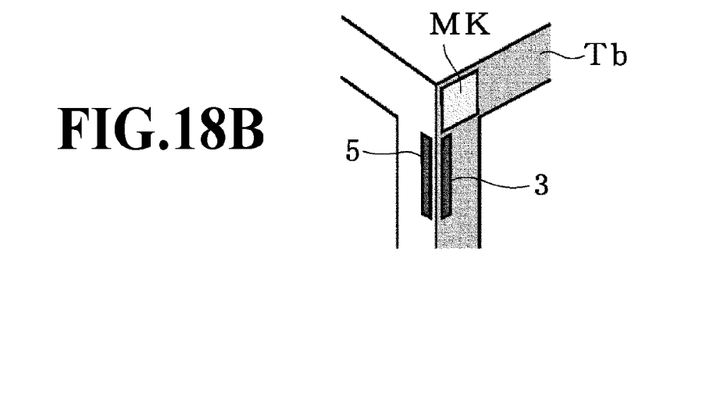
FIG. 18B is a perspective view illustrating, in order to explain the effect of the marker according to Embodiments 1 to 3 of the present invention, a case where the two variable moire patterns 3 and 5 are arranged on different planes.

FIGS. 18A and 18B are a perspective view illustrating the effect of the markers according to Embodiments 1 to 3 of the present invention. FIG. 18A illustrates an example in which two variable moire patterns 3 are provided on the same plane. FIG. 18B illustrates an example of a case where two variable moire patterns 3 and 5 are provided on different planes. As shown in FIG. 18A and FIG. 18B, the variable moire patterns 3 and 5 according to the embodiment of the present invention is provided on a side face Tb of a table consisting of a small region that does not accommodate the conventional variable moire pattern 52 for example. Thus, a marker is configured together with the two-dimensional pattern MK depending on the diversity of the environment such as the shape of a measurement object. In FIG. 18A, an example is shown in which the two variable moire patterns 3 is used. However, the two variable moire patterns 3 also may be substituted with two variable moire patterns 5.

Embodiment 4

Figure 19:
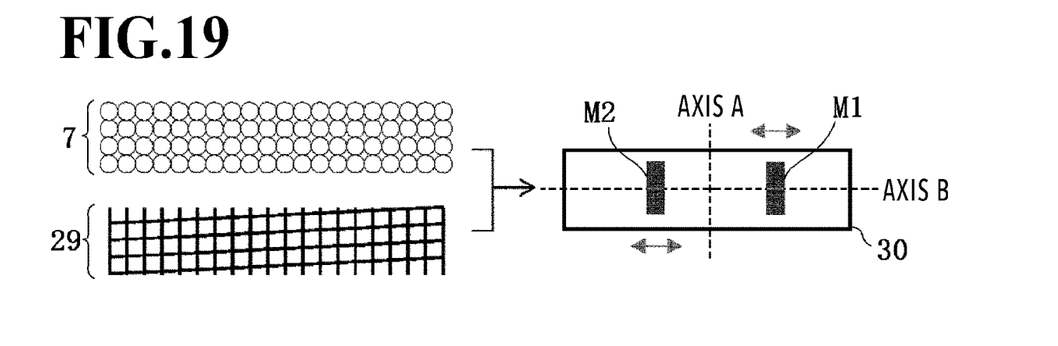
FIG. 19 is a plan view illustrating the manufacturing method of the variable moire pattern 30 according to Embodiment 4 of the present invention.

FIG. 19 is a plan view illustrating the manufacturing method of the variable moire pattern 30 according to Embodiment 4 of the present invention. The variable moire pattern 30 forms a pattern 29 shown in FIG. 19 on a two-dimensional plane constituting the top surface of the lens substrate. The variable moire pattern 30 is manufactured by placing a lens array 7 on the pattern 29. The pattern 29 is configured so that the stripe pattern 9 shown in FIG. 3 for example and the stripe pattern 10 shown in FIG. 5 are superposed.

In the case of the variable moire pattern 30 having the configuration as described above, as shown in FIG. 19, the travel of the moving mark M1 depending on the visual line angle around the axis A is observed in accordance with the stripe pattern 9 included in the pattern 29. In addition, the travel of the moving mark M2 depending on the visual line angle around the axis B is observed in accordance with the stripe pattern 10 included in the pattern 29.

Specifically, in one variable moire pattern 30, the two moving marks M1 and M2 are observed. Depending on the position of the moving mark M1, the visual line angle around the axis A is calculated. Depending on the position of the moving mark M2, the visual line angle around the axis B is calculated.

However, the variable moire pattern 30 requires the distinction between the two moving marks M1 and M2. Consequently, the moving marks M1 and M2 have colors different from each other by applying different colors to superposed stripe patterns.

By processing an image obtained by imaging the two moving marks M1 and M2, the two moving marks M1 and M2 is distinguished from each other.

If the two moving marks M1 and M2 are superposed however, it is not easy to measure the position of the lower moving mark. Consequently, a plurality of lower moving marks are generated in the variable moire pattern 30 to form the stripe patterns 9 and 10 so that any of the lower moving marks is always prevented from being superposed with the upper moving mark.

Figure 20:
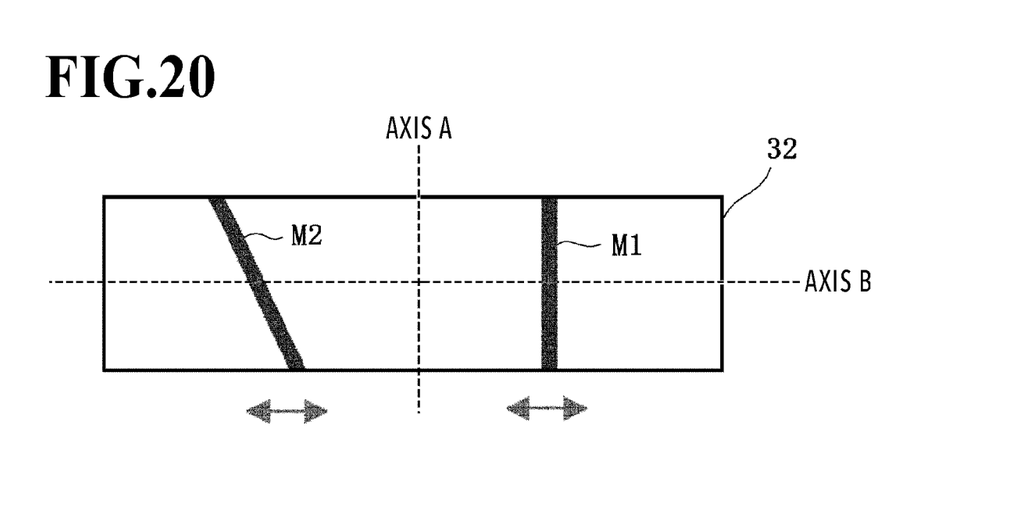
FIG. 20 is a plan view illustrating the modification example of the variable moire pattern 30 shown in FIG. 19.

To distinguish the two moving marks M1 and M2, as shown in FIG. 20, the variable moire pattern 32 includes the moving mark M2 having a slope different from that of the moving mark M1.

The slope of the moving mark M2, i.e., an angle formed by the moving mark M2 and the axis B is caused to change depending on the interval of the stripe pattern 10.

By using the variable moire pattern 32, even though the moving marks M1 and M2 moving in the left-and-right direction in the drawing are superposed when being seen from a certain visual point, the two moving marks M1 and M2 are prevented from being superposed completely. Thus, an image obtained by imaging the moving marks M1 and M2 is processed to thereby distinguish the moving marks M1 and M2.

By changing a slope of the stripe pattern 9, not the moving mark M2 but the moving mark M1 is inclined like the moving mark M2. Furthermore, in order to more easily distinguish the moving marks M1 and M2 by the image processing, the moving marks M1 and M2 also may have both slopes in opposite directions at the same time.

According to the variable moire pattern 32 of Embodiment 4 of the present invention, the use of one variable moire pattern 32 is used to calculate, depending on the positions of the moving marks M1 and M2, the visual line angles around the axis A and the axis. According to Embodiment 4 of the present invention, the combination with a two-dimensional pattern for example is used to further reduce the area of a marker required to measure the posture of the object.

REFERENCE SIGNS LIST

1, 11, 13, 15, 17, 19, 54 Planar visual marker
2, 50 Two-dimensional pattern
3, 5, 30, 32, 52 Variable moire pattern
6 Lens
7 Lens array
9, 10, 25, 29 Stripe pattern

The invention claimed is:

1. A marker in which an observed pattern changes depending on a direction, comprising:
 a stripe pattern formed on a two-dimensional plane shape; and
a lens array in which a plurality of lenses are arranged on the two-dimensional plane including the stripe pattern,
 wherein the two-dimensional plane has an oblong shape,
 the stripe pattern includes a first marker in which the stripe pattern is parallel to the arrangement of the plurality of lenses in a short side direction of the oblong shape and a second marker in which the stripe pattern obliquely intersects with the arrangement of the plurality of lenses in a long side direction of the oblong shape, and
 the first marker and the second marker are provided so that the corresponding long sides are positioned on the same line or on parallel lines.

2. The marker according to claim 1, wherein: the first marker and the second marker are provided so that the long sides are abutted to each other.

3. The marker according to claim 1, wherein the stripe pattern is obtained by superposing a first stripe parallel to the arrangement of the plurality of lenses and a second stripe pattern that obliquely intersects with the arrangement of the plurality of lenses in a direction orthogonal to the first stripe pattern.

4. A method of manufacturing a marker in which an observed pattern changes depending on a direction, the method comprising:
 a first step of forming a plurality of different patterns on a top surface of one lens substrate or a back surface of a lens array; and
 a second step of placing a lens array consisting of a plurality of lenses on the top surface of the lens substrate having thereon the plurality of different patterns, or placing the lens array having the plurality of different patterns on the back surface on the top surface of the lens substrate, or coloring the entirety of the back surface having the plurality of different patterns with a color different from that of the plurality of different patterns,
 wherein the plurality of different patterns include a first stripe pattern that is parallel to the arrangements of the plurality of lenses and a second stripe pattern that obliquely intersects with the arrangement of the plurality of lenses in a direction orthogonal to the first stripe pattern.

* * * * *